O. E. WATSON & R. LINT.
BUTTON CLEANING SHIELD.
APPLICATION FILED MAR. 17, 1914.

1,122,449.

Patented Dec. 29, 1914.

Witnesses
Elwood H. Werling
J. M. Rice

Inventors
Oliver E. Watson
and Roger Lint
By Howard S. Smith,
Their Attorney

UNITED STATES PATENT OFFICE.

OLIVER E. WATSON AND ROGER LINT, OF DAYTON, OHIO.

BUTTON-CLEANING SHIELD.

1,122,449.   Specification of Letters Patent.   Patented Dec. 29, 1914.

Application filed March 17, 1914. Serial No. 825,429.

*To all whom it may concern:*

Be it known that we, OLIVER E. WATSON and ROGER LINT, citizens of the United States, residing at Dayton, in the county of Montgomery and State of Ohio, have invented certain new and useful Improvements in Button-Cleaning Shields, of which the following is a specification.

This invention relates to new and useful improvements in button cleaning shields.

The object of our invention is to provide a device adapted to readily receive and hold for cleaning and polishing, one or more buttons attached to a uniform or other garment, without danger of the latter being soiled by the polish employed. The buttons are adapted to be easily inserted and removed from the shield, and when in position therein, they are so firmly gripped that there is absolutely no danger of any polish dropping through upon the garment to which the buttons are secured.

One embodiment of our invention is illustrated in the accompanying drawings, of which—

Figure 1:
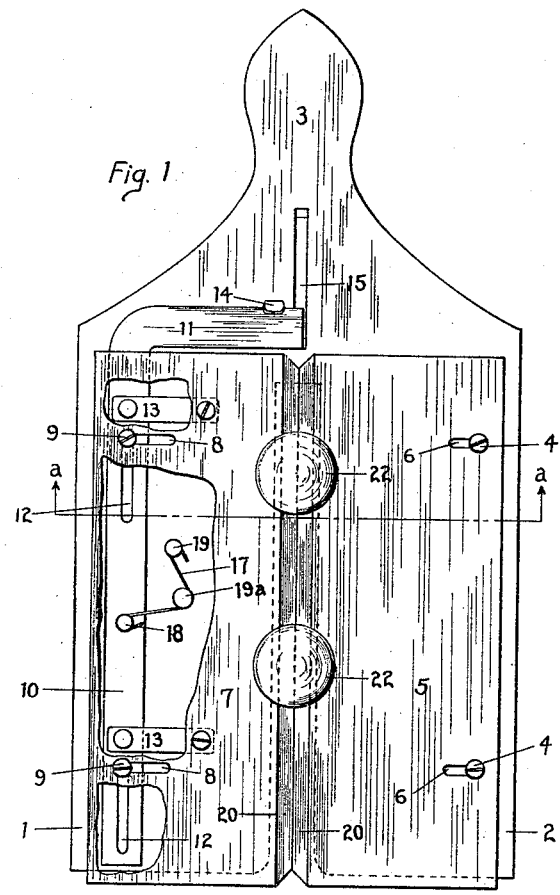
Figure 2:
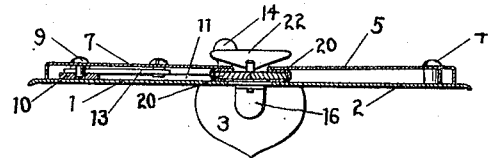
Figure 3:
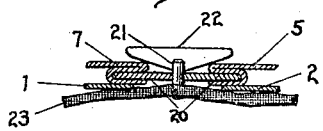

Figure 1 is a plan view of our improved button cleaning shield. Fig. 2 is a section taken on the line a—a of Fig. 1. And Fig. 3 is a sectional view showing the shank of a button within the grip of the shield.

Throughout the specification and drawings, similar reference characters denote corresponding parts.

In a detailed description of our invention, the numerals 1 and 2 designate two flat parallel members which project from and are preferably integral with a handle portion 3. The members 2 and 3 are positioned a short distance apart, and rigidly secured to the member 2 by screws 4, is a plate 5 which preferably extends a short distance beyond the front edge of said member. The plate 5 is provided with transverse slots 6 to receive the screws 4, whereby it may be adjusted to different lateral positions on the member 2.

Slidingly mounted on the member 1 is a plate 7 similar to and parallel with the plate 5. Provided in the plate 7 are two transverse slots 8 which receive screws 9 that guide said plate in its movement and secure it to the member 1. The plate 7 is adapted to be moved upon the member 1, toward and away from the plate 5, by the following mechanism: Extending between the slidable plate 7 and member 1, and under the transverse slots 8, is a longitudinal actuating member 10, which terminates at a point beyond said plate in a right angle handle portion 11. This actuating member 10 is provided with longitudinal slots 12 which also receive the screws 9 to permit said actuating member to be moved longitudinally upon the member 1. The actuating member 10 is also pivotally connected to the plate 7 by arms 13. It will now be observed that when the actuating member 10 is moved longitudinally, it will, through the arms 13, shift the plate 7 laterally, because the slots 8 in the plate 7, which receive the screws 9, will not permit said plate to be moved in any other way. For the purpose of gripping the longitudinal member 10, the latter has provided on its handle portion 11 a thumb piece 14. The handle end of the actuating member 10 is turned inwardly to enter a longitudinal slot 15 provided in the handle portion 3. This inwardly projecting end of the member 10 is movable in the slot 15, and extends through it to receive a trigger 16, which, together with the thumb piece 14, enables the actuating member 10 to be firmly gripped by both the first finger and thumb of the hand holding the shield and longitudinally moved thereby. (See Figs. 1 and 2.) When the actuating member 10 is drawn toward the apex of the handle portion 3, it will move the plate 7 away from the plate 5, and at the same time will place under tension a spring 17 connected to the actuating member 10 by a pin 18 and to the member 1 by pins 19 and $19^a$. Accordingly, when the hand releases its grip on the actuating member 10, the spring 17 will draw said member inwardly to force the plate 7 toward the plate 5.

The facing edges of the plates 5 and 7 are constructed in such a manner that each provides a longitudinal groove to tightly receive a strip 20 made of rubber or other suitable resilient material. When the plate 7 is moved away from the plate 5, there will be a sufficient opening between the strips 20 to admit the shanks of one or more buttons to be polished. The strips 20 are then adapted to grip the shanks of these buttons tightly between them when the plate 7 is moved toward the plate 5 by the power stored in the spring 17, supplemented, if necessary, by a pushing force exerted on the actuating member 10.

In operation, the shield is held in a position to receive the shank 21 of a button 22 secured to a fabric 23 (see Fig. 3). The thumb piece 14 and trigger 16 are then gripped by the thumb and first finger of the hand by which the shield is held, to move the actuating member 10 toward the operator, whereupon the plate 7 will be drawn away from the plate 5 to admit the shank 21 between the resilient strips 20. The actuating member 10 is then pushed inwardly to assist the spring 17 in forcing the strip 20 of the plate 7, tightly against the strip 20 carried by the plate 5. The strips 20 will then grip the shank 21 of the button 22 in such a tight manner that, when the latter is shined, no polish can pass through or between the said strips to soil the garment to which the button is attached.

Our improved shield can be constructed of a size to grip any number of buttons, and at the same time fully protect the garment to which they are attached from being soiled by the polish applied.

We do not wish to be limited to the details of construction and arrangement herein shown and described, and any changes or modifications may be made therein within the scope of the subjoined claims.

Having described our invention, we claim:

1. A button cleaning shield comprising two parallel separated members connected to a handle portion, a plate rigidly secured to one of said members, a plate slidingly movable upon the other member, a resilient strip secured to each one of the facing edges of said plates, an actuating member operatively connected to the slidable plate, said member adapted to be moved longitudinally to force the slidable plate away from and toward the stationary one, and means for guiding said actuating member and slidable plate during their respective movements, substantially as described.

2. A button cleaning shield comprising two flat parallel members connected to a handle portion, a plate rigidly secured to one of said members, a similar plate slidingly movable upon the other member, a resilient strip secured to each one of the facing edges of said plates, a longitudinally movable actuating member for the slidable plate, arms pivotally connecting said actuating member to the slidable plate, said actuating member provided with longitudinal slots, said slidable plate having a transverse slot for each longitudinal slot of the actuating member, and a stationary pin extending through each longitudinal slot and its corresponding transverse slot, whereby the slidable plate will be shifted laterally by the actuating member when the latter is moved longitudinally, substantially as described.

In testimony whereof we have hereunto set our hands this 14th day of March, A. D. 1914.

OLIVER E. WATSON.
ROGER LINT.

Witnesses:
WALTER V. SNYDER,
HOWARD S. SMITH.

Copies of this patent may be obtained for five cents each, by addressing the "Commissioner of Patents, Washington, D. C."